(12) United States Patent
Kohn et al.

(10) Patent No.: US 11,142,985 B2
(45) Date of Patent: Oct. 12, 2021

(54) SEALING APPARATUS FOR HIGH PRESSURE HIGH TEMPERATURE (HPHT) APPLICATIONS

(71) Applicant: Halliburton Energy Services, Inc., Houston, TX (US)

(72) Inventors: Gary Allen Kohn, Carrollton, TX (US); Shane Patrick Furlong, Frisco, TX (US); Shengjun Yin, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 16/072,604

(22) PCT Filed: Feb. 29, 2016

(86) PCT No.: PCT/US2016/020063
§ 371 (c)(1),
(2) Date: Jul. 25, 2018

(87) PCT Pub. No.: WO2017/151094
PCT Pub. Date: Sep. 8, 2017

(65) Prior Publication Data
US 2019/0032442 A1 Jan. 31, 2019

(51) Int. Cl.
*F16J 15/02* (2006.01)
*E21B 33/12* (2006.01)
(Continued)

(52) U.S. Cl.
CPC .......... *E21B 33/1208* (2013.01); *E21B 33/10* (2013.01); *F16J 15/16* (2013.01); *F16J 15/32* (2013.01); *F16J 15/3284* (2013.01)

(58) Field of Classification Search
CPC ...... F16J 15/062; F16J 15/3204; F16J 15/166; F16J 15/181; F16J 15/3236; F16J 15/02; F16J 15/32
See application file for complete search history.

(56) References Cited

U.S. PATENT DOCUMENTS

| 2,456,356 A | * | 12/1948 | Aber | F16J 15/32 |
| | | | | 277/584 |
| 3,359,999 A | * | 12/1967 | Mueller | F16K 5/0257 |
| | | | | 137/246.15 |

(Continued)

FOREIGN PATENT DOCUMENTS

| CN | 102817573 A | 12/2012 |
| CN | 102865048 A | 1/2013 |

(Continued)

OTHER PUBLICATIONS

Office Action issued for Canadian Patent Application No. 3,010,783 dated Mar. 28, 2019, 5 pages.

(Continued)

*Primary Examiner* — Vishal A Patel

(57) ABSTRACT

A sealing apparatus and related method for sealing an annular space between concentrically disposed members. In an exemplary embodiment, the method includes providing a sealing ring within the annular space, the sealing ring defining oppositely inclined interior and exterior surfaces each having a generally frusto-conical shape and defining opposing first and second edges, a nose adjoining the respective first edges of the interior and exterior surfaces, and a first convex surface adjoining the respective second edges of the interior and exterior surfaces opposite the nose; and forming a seal against a fluid pressure in the annular space, comprising depressing the first convex surface of the sealing ring so that the interior and exterior surfaces thereof expand radially to exert contact stress on each of the concentrically disposed members.

18 Claims, 6 Drawing Sheets

(51) Int. Cl.
  *F16J 15/32* (2016.01)
  *E21B 33/10* (2006.01)
  *F16J 15/16* (2006.01)
  *F16J 15/3284* (2016.01)

(56) References Cited

U.S. PATENT DOCUMENTS

| | | | |
|---|---|---|---|
| 3,767,215 A * | 10/1973 | Brown | F16J 15/021 |
| | | | 277/638 |
| 3,782,736 A * | 1/1974 | Valente | F16J 15/3204 |
| | | | 277/550 |
| 4,288,082 A | 9/1981 | Setterberg, Jr. | |
| 4,406,469 A | 9/1983 | Allison | |
| 4,473,231 A | 9/1984 | Tilton et al. | |
| 4,828,274 A * | 5/1989 | Stannard | B65D 90/105 |
| | | | 220/378 |
| 5,297,805 A | 3/1994 | Merkin et al. | |
| 5,309,993 A | 5/1994 | Coon et al. | |
| 6,123,337 A | 9/2000 | Fang et al. | |
| 7,461,708 B2 | 12/2008 | Yong et al. | |
| 10,539,238 B2 * | 1/2020 | Pisasale | F16J 15/08 |
| 2003/0222410 A1 | 12/2003 | Williams et al. | |
| 2006/0032673 A1 | 2/2006 | Yong et al. | |
| 2006/0186601 A1 * | 8/2006 | Lopez | E21B 33/12 |
| | | | 277/327 |
| 2008/0029264 A1 | 2/2008 | Williams et al. | |
| 2009/0189358 A1 | 7/2009 | Briscoe et al. | |
| 2009/0206558 A1 * | 8/2009 | Nameki | F16J 15/062 |
| | | | 277/644 |
| 2010/0219592 A1 | 9/2010 | Tuckness et al. | |
| 2012/0043331 A1 * | 2/2012 | Nameki | F16J 15/062 |
| | | | 220/378 |
| 2014/0345850 A1 | 11/2014 | Galle et al. | |
| 2016/0084382 A1 * | 3/2016 | Pisasale | F16J 15/10 |
| | | | 29/428 |

FOREIGN PATENT DOCUMENTS

| | | |
|---|---|---|
| CO | 20130122315 | 5/2013 |
| EP | 2719856 | 4/2014 |
| EP | 2872731 | 5/2015 |
| GB | 1068721 A | 5/1967 |
| GB | 2358419 | 7/2001 |
| WO | WO2000/046483 | 8/2000 |
| WO | WO2003/102360 | 12/2003 |
| WO | WO 2014/189647 A1 | 11/2014 |

OTHER PUBLICATIONS

Extended European Search Report issued for European Patent Application No. 16892845.5, dated Sep. 11, 2019, 8 pages.
Colombian Office Action issued for Colombian Patent Application No. NC2018/0007724, dated Aug. 12, 2019, 8 pages.
Search Report and Written Opinion issued by the Intellectual Property Office of Singapore for Patent Application No. 11201805696V dated Nov. 7, 2019; 9 pages.
Office Action issued by the Chinese National Intellectual Property Administration dated Nov. 25, 2019; 9 pages.
International Search Report and the Written Opinion of the International Search Authority, or the Declaration, dated Nov. 23, 2016, PCT/US2016/020063, 19 pages, ISA/KR.

* cited by examiner

SEALING APPARATUS FOR HIGH PRESSURE HIGH TEMPERATURE (HPHT) APPLICATIONS

PRIORITY

The present application is a U.S. National Stage patent application of International Patent Application No. PCT/US2016/020063, filed on Feb. 29, 2016, the benefit of which is claimed and the disclosure of which is incorporated herein by reference in its entirety.

TECHNICAL FIELD

The present disclosure relates generally to seals for use oil and gas operations such as drilling, completion, and production, and, more specifically, to a sealing apparatus for high pressure high temperature ("HPHT") applications.

BACKGROUND

"Chevron" or "vee" seals are used in sealing apparatus to provide both static and dynamic seals between concentrically disposed members in oil, gas, geothermal, water injection, and other wells. In order to form an effective seal, the contact stress between the chevron seals and the concentrically disposed members must be greater than the fluid pressure applied to the wetted face of the chevron seals. However, chevron seals were designed to perform under substantially less severe temperature and pressure conditions than those encountered during modern oilfield operations. For example, well conditions in the oil and gas industry during the development of chevron seals rarely exceeded 5,000 psi and 250° F. However, it is not uncommon for chevron seals to experience pressures of 12,500 psi and temperatures of 400° F.

As a result, during modern oilfield operations, issues may arise with the performance of chevron seals, due in part to the fact that the bulk modulus of an elastomeric material is temperature dependent. Specifically, the volume of an elastomeric chevron seal is prone to crush under hydrostatic loading when subjected to elevated pressures and temperatures, resulting in significant volume reduction and a smaller cross-section of material for sealing against the concentrically disposed members. As a result, the contact stress between the chevron seal and the concentrically disposed members falls below the fluid pressure applied to the wetted face of the chevron seal, ultimately compromising the integrity of the seal.

Therefore, what is needed is an apparatus or method to address one or more of the foregoing issues, and/or one or more other issues.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
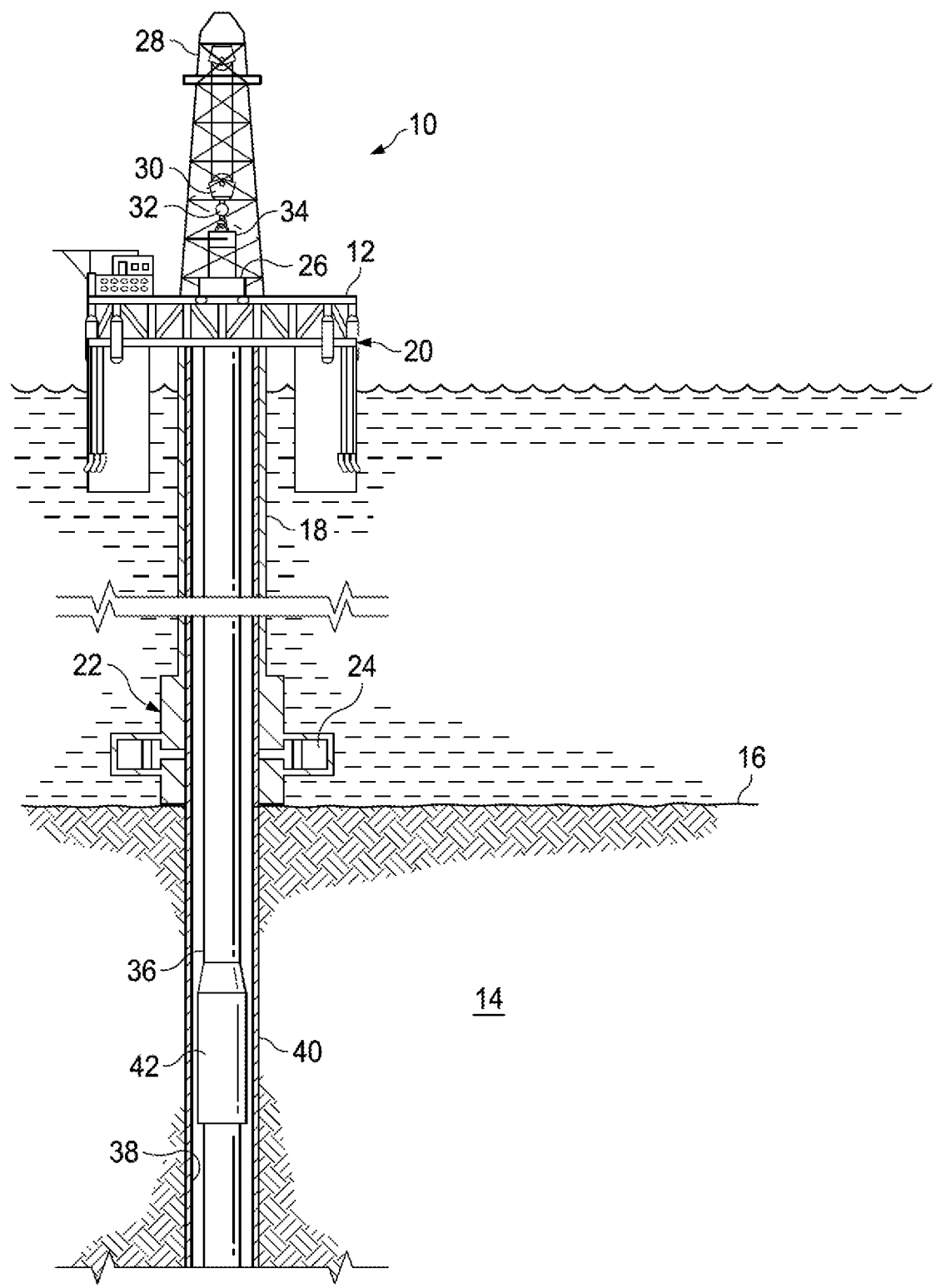
FIG. 1 is a schematic illustration of an offshore oil and gas platform operably coupled to a well tool disposed within a wellbore, according to an exemplary embodiment.

Illustrative embodiments and related methods of the present disclosure are described below as they might be employed in a sealing apparatus for HPHT applications. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples or Figures. This repetition is for the purpose of simplicity and clarity and does not in itself dictate a relationship between the various embodiments and/or configurations discussed. Further, it should be understood that the use of spatially relative terms such as "above," "below," "upper," "lower," "upward," "downward," "uphole," "downhole," and the like are used in relation to the illustrative embodiments as they are depicted in the Figures, the upward and downward directions being toward the top and bottom of the corresponding Figure, respectively, and the uphole and downhole directions being toward the surface and toe of the well, respectively. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Although a Figure may depict a horizontal wellbore or a vertical wellbore, unless indicated otherwise, it should be understood that the apparatus according to the present disclosure is equally well suited for use in wellbores having other orientations including vertical wellbores, horizontal wellbores, slanted wellbores, multilateral wellbores, or the like. Further, unless otherwise noted, even though a Figure may depict an offshore operation, it should be understood that the apparatus according to the present disclosure is equally well suited for use in onshore operations. Finally, unless otherwise noted, even though a Figure may depict a cased-hole wellbore, it should be understood that the apparatus according to the present disclosure is equally well suited for use in open-hole wellbore operations.

Referring to FIG. 1, an offshore oil and gas platform is schematically illustrated and generally designated by the reference numeral 10. In an exemplary embodiment, the offshore oil and gas platform 10 includes a semi-submersible platform 12 that is positioned over a submerged oil and gas formation 14 located below a sea floor 16. A subsea conduit 18 extends from a deck 20 of the platform 12 to a subsea wellhead installation 22. One or more pressure control devices 24, such as, for example, blowout preventers (BOPs), and/or other equipment associated with drilling or producing a wellbore may be provided at the subsea wellhead installation 22 or elsewhere in the system. The platform 12 may include a hoisting apparatus 26, a derrick 28, a travel block 30, a hook 32, and a swivel 34, which components are together operable for raising and lowering a conveyance vehicle 36.

A variety of conveyance vehicles 36 may be raised and lowered from the platform 12, such as, for example, casing, drill pipe, coiled tubing, production tubing, other types of pipe or tubing strings, and/or other types of conveyance vehicles, such as wireline, slickline, and the like. In the embodiment of FIG. 1, the conveyance vehicle 36 is a substantially tubular, axially extending tubular string made up of a plurality of pipe joints coupled to one another end-to-end. The platform 12 may also include a kelly, a rotary table, a top drive unit, and/or other equipment associated with the rotation and/or translation of the conveyance vehicle 36. A wellbore 38 extends from the subsea wellhead installation 22 and through the various earth strata, including the formation 14. At least a portion of the wellbore 38 may include a casing string 40 cemented therein. Connected to the conveyance vehicle 36 and extending within the wellbore 38 is a well tool 42 in which the seal assembly for HPHT applications of the present disclosure is incorporated.

Figure 2:
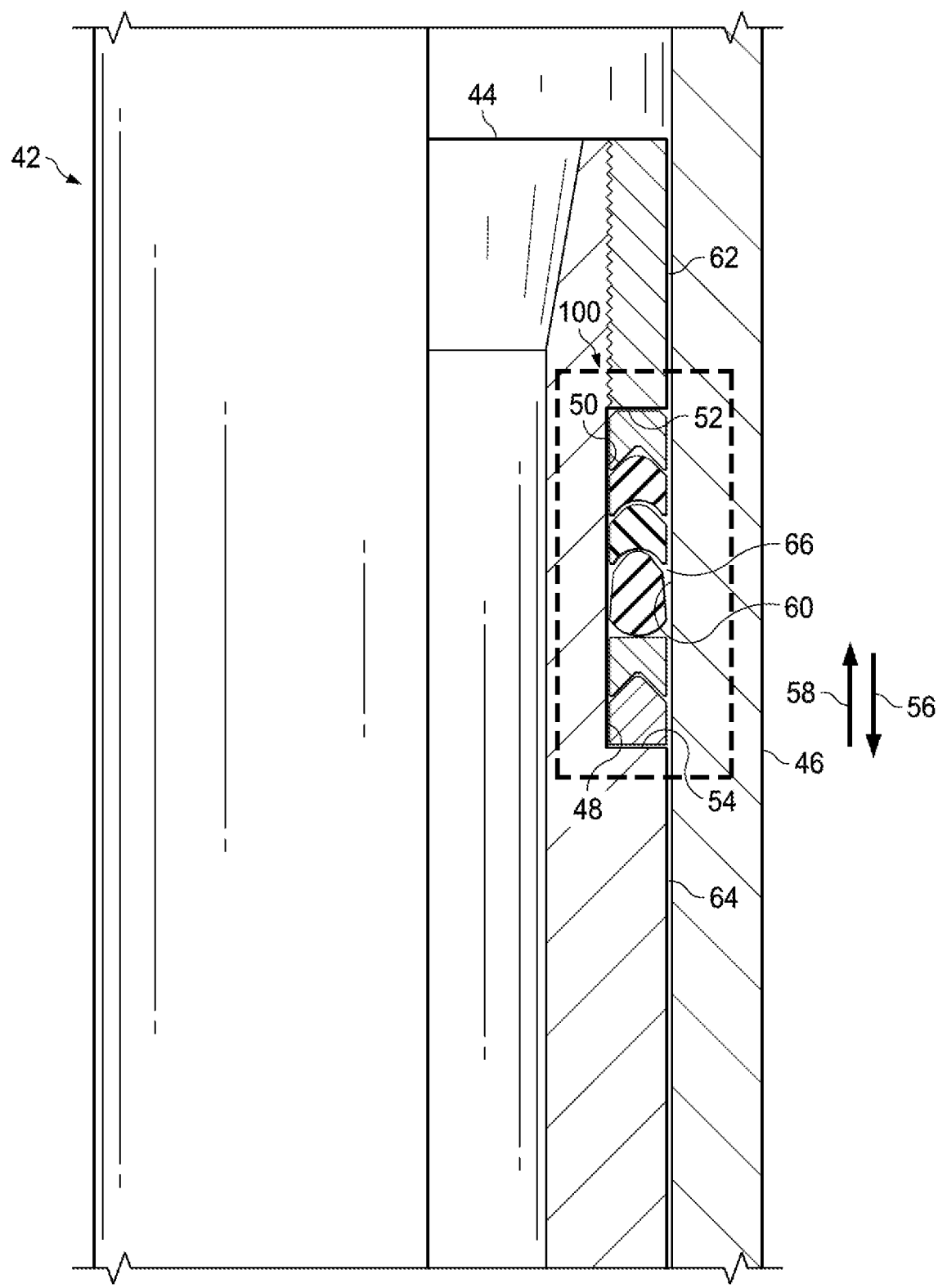
FIG. 2 is a partial cross-section of the well tool of FIG. 1, the well tool including a seal mandrel, a receptacle, and a sealing apparatus, according to an exemplary embodiment.

Referring to FIG. 2, an exemplary embodiment of the well tool 42 is illustrated. The well tool 42 includes a seal mandrel 44, a receptacle 46 within which the seal mandrel 44 extends, and a sealing apparatus 100 that sealingly engages both the seal mandrel 44 and the receptacle 46. The seal mandrel 44 includes an annular groove 48 formed in the exterior thereof. In several exemplary embodiments, instead of being formed in the exterior of the seal mandrel 44, the annular groove 48 is formed in the interior of the receptacle 46. In any event, the annular groove 48 defines an axially-extending surface 50 adjoining a pair of opposing annular shoulders 52 and 54. The annular shoulder 52 faces in an axial direction 56. In contrast, the annular shoulder 54 faces in an axial direction 58, which is substantially opposite the axial direction 56. The receptacle 46 defines an interior bore 60 within which the seal mandrel 44 is adapted to stroke. Clearance gaps 62 and 64 are defined between the seal mandrel 44 and the interior bore 60 of the receptacle 46 on opposing sides of the annular groove 48. In several exemplary embodiments, the seal mandrel 44 includes a threaded ring that defines the annular shoulder 52, the threaded ring being removable from the seal mandrel 44 to permit installation of the sealing apparatus 100. In several exemplary embodiments, one or both of the annular shoulders 52 and 54 are defined by lantern rings attached to the exterior of the seal mandrel 44 or, alternatively, to the interior bore 60 of the receptacle 46.

The well tool 42 could be any well tool utilized for the drilling, completion, production, workover, and/or treatment of the wellbore 38. Additionally, in several exemplary embodiments, the seal mandrel 44 is, includes, or is part of a well tool and the receptacle 46 is, includes, or is part of another well tool. Moreover, one or both of the seal mandrel 44 and or the receptacle 46 may be omitted in favor of an equivalent component of the well tool 42 or another well tool utilized for the drilling, completion, production, workover, and/or treatment of the wellbore 38, as the case may be.

The sealing apparatus 100 is disposed within the annular groove 48, between the annular shoulders 52 and 54. When the sealing apparatus 100 is not energized, a clearance gap 66 may be defined between the sealing apparatus 100 and the interior bore 60 of the receptacle 46. The clearance gaps 62, 64, and 66 together define an annular space within which the sealing apparatus 100 is adapted to seal against a fluid pressure. When the sealing apparatus 100 is energized, as will be discussed in further detail below, the sealing apparatus 100 is capable of providing either static or dynamic sealing between the seal mandrel 44 and the receptacle 46. For example, when the sealing apparatus 100 is energized while the seal mandrel 44 is stationary relative to the receptacle 46, both the axially-extending surface 52 of the seal mandrel 44 and the interior bore 60 of the receptacle 46 are sealingly engaged by the sealing apparatus 100 to form a static seal. In contrast, when the sealing apparatus 100 is energized during the stroke of the seal mandrel 44, the axially-extending surface 50 of the seal mandrel 44 is sealingly engaged by the sealing apparatus 100 and the interior bore 60 of the receptacle 46 is sealingly and slidably engaged by the sealing apparatus 100 to form a dynamic seal. Although the sealing apparatus 100 is described herein as forming a seal between the seal mandrel 44 and the receptacle 46, the sealing apparatus 100 may also be utilized to form a seal between other concentrically disposed components within the wellbore 38 or elsewhere.

Figure 3:
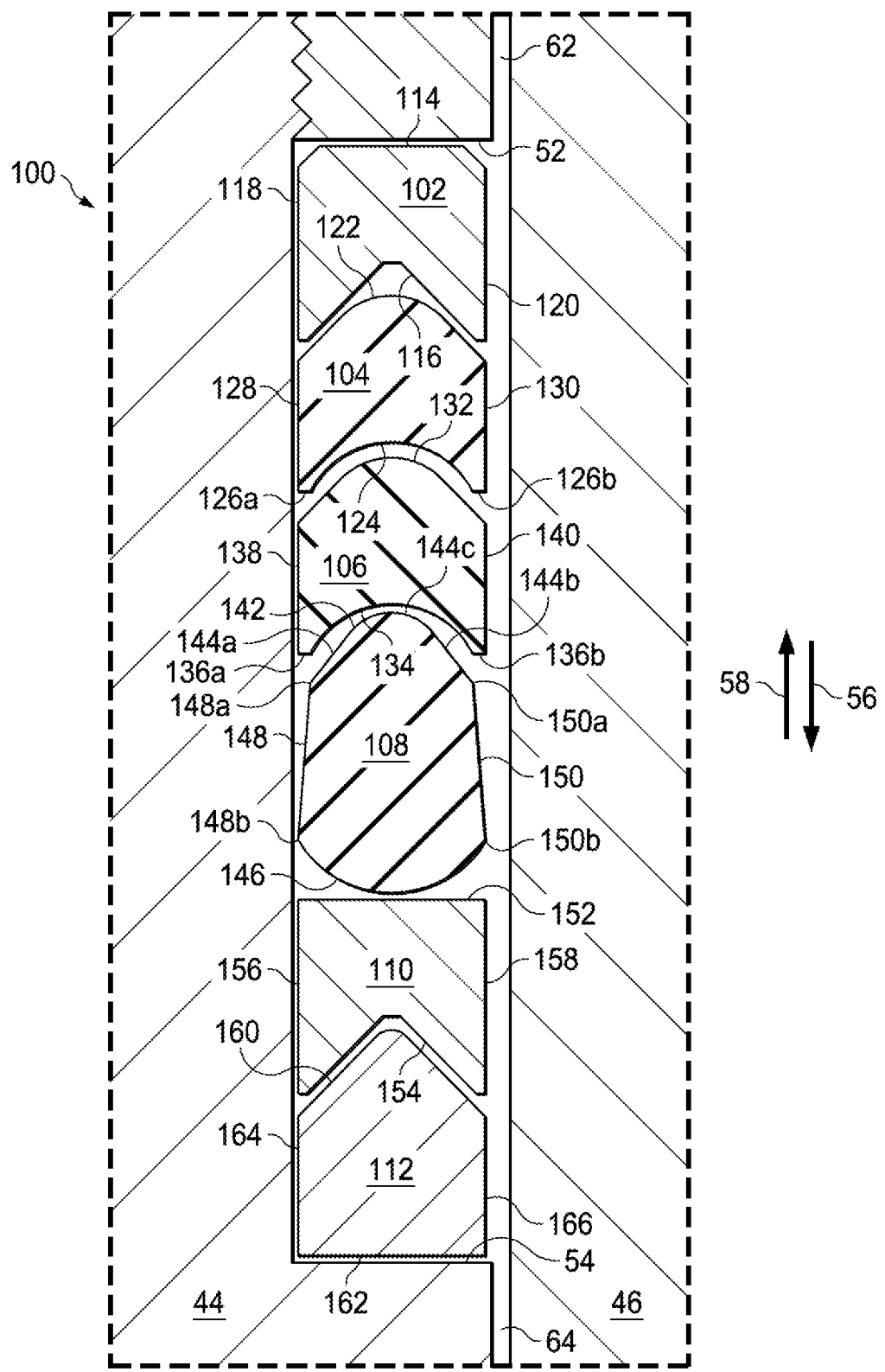
FIG. 3 is an enlarged view of the sealing apparatus of FIG. 2, the sealing apparatus including an adapter, a pair of back-up rings, a sealing ring, a compression ring, and an energizing ring, according to an exemplary embodiment.

Referring to FIG. 3, an exemplary embodiment of the sealing apparatus 100 is illustrated. The sealing apparatus 100 includes an adapter 102, a pair of back-up rings 104 and 106, a sealing ring 108, a compression ring 110, and an energizing element 112.

The adapter 102 extends about the seal mandrel 44 and is disposed within the annular groove 48, adjacent and between the annular shoulder 52 and the back-up ring 104. The adapter 102 includes a generally planar surface 114 facing in the axial direction 58. The planar surface 114 is adapted to engage the annular shoulder 52 when the sealing apparatus 100 is energized. The adapter 102 also includes a substantially V-shaped concave surface 116 opposing the planar surface 114 and facing generally in the axial direction 56. Moreover, an interior wall 118 of the adapter 102 extends axially between the planar surface 114 and the concave surface 116. Similarly, an exterior wall 120 of the adapter 102 extends axially between the planar surface 114 and the concave surface 116, opposite the interior wall 118. In several exemplary embodiments, the interior and exterior walls 118 and 120 are spaced in a substantially parallel relation. In several exemplary embodiments, the adapter 102 is formed of a rigid material, such as, for example, plastic, composite, metal, another rigid material, or any combination thereof. However, other materials could be used to form the adapter 102 based on factors such as chemical compatibility, application temperature, sealing pressure, and the like.

The back-up ring 104 extends about the seal mandrel 44 and is disposed within the annular groove 48, adjacent and between the adapter 102 and the back-up ring 106. The back-up ring 104 includes a substantially arc-shaped nose 122 facing generally in the axial direction 58. The nose 122 is adapted to engage the concave surface 116 of the adapter 102 when the sealing apparatus 100 is energized. The back-up ring 104 also includes a substantially arc-shaped concave surface 124 opposing the nose 122. The concave surface 124 faces generally in the axial direction 56 and is adjoined by a pair of generally planar segments 126a and 126b on opposing sides thereof. Moreover, an interior wall 128 of the back-up ring 104 adjoins and extends axially between the nose 122 and the planar segment 126a. Similarly, an exterior wall 130 of the back-up ring 104 adjoins and extends axially between the nose 122 and the planar segment 126b, opposite the interior wall 128. In several exemplary embodiments, the interior and exterior walls 128 and 130 are spaced in a substantially parallel relation.

In an exemplary embodiment, the back-up ring 104 is formed of polyetheretherketone (PEEK). However, the back-up ring 104 may be formed of another thermoplastic or thermoset material, such as, for example, polytetrafluoroethylene (PTFE), a.k.a. Teflon®, among others. Moreover, other materials could be used to form the back-up ring 104 based on factors such as chemical compatibility, application temperature, sealing pressure, and the like. Additionally, even though the back-up ring 104 has been depicted as having the nose 122 and the concave surface 124 adjoined by the planar segments 126a and 126b, the back-up ring 104 could have alternate shapes or configurations, such as, for example, a chevron- or vee-shape, among others. In any event, the back-up ring 104 is adapted to flare outwardly to provide support and prevent extrusion of the back-up ring 106 and the sealing ring 108 when the sealing apparatus 100 is energized.

The back-up ring 106 extends about the seal mandrel 44 and is disposed within the annular groove 48, adjacent and between the back-up ring 104 and the sealing ring 108. The back-up ring 106 includes a substantially arc-shaped nose 132 facing generally in the axial direction 58. The nose 132 is adapted to engage the concave surface 124 and the planar segments 126a and 126b of the back-up ring 104 when the sealing apparatus 100 is energized. The back-up ring 106 also includes a substantially arc-shaped concave surface 134 opposing the nose 132. The concave surface 134 faces generally in the axial direction 56 and is adjoined by a pair of generally planar segments 136a and 136b on opposing sides thereof. Moreover, an interior wall 138 of the back-up ring 106 adjoins and extends axially between the nose 132 and the planar segment 136a. Similarly, an exterior wall 140 of the back-up ring 106 adjoins and extends axially between the nose 132 and the planar segment 136b, opposite the interior wall 138. In several exemplary embodiments, the interior and exterior walls 138 and 140 are spaced in a substantially parallel relation.

In an exemplary embodiment, the back-up ring 106 is formed of polytetrafluoroethylene (PTFE), a.k.a. Teflon®. However, the back-up ring 104 may be formed of another thermoplastic or thermoset material, such as, for example, polyetheretherketone (PEEK), among others. Moreover, other materials could be used to form the back-up ring 106 based on factors such as chemical compatibility, application temperature, sealing pressure, and the like. Additionally, even though the back-up ring 106 has been depicted as having the nose 132 and the concave surface 134 adjoined by the planar segments 136a and 136b, the back-up ring 106 could have alternate shapes or configurations, such as, for example, a chevron- or vee-shape, among others. In any event, the back-up ring 106 is adapted to flare outwardly to provide support and prevent extrusion of the sealing ring 108 when the sealing apparatus 100 is energized.

The sealing ring 108 extends about the seal mandrel 44 and is disposed within the annular groove 48, adjacent and between the back-up ring 106 and the compression ring 110. The sealing ring 108 includes a nose 142 defining, for example, a pair of oppositely inclined surfaces 144a and 144b, and a substantially arc-shaped convex surface 144c adjoining the surfaces 144a and 144b. In several exemplary embodiments, the surfaces 144a and 144b each have a generally frusto-conical shape. The nose 142 faces generally in the axial direction 58 and is adapted to engage the concave surface 134 and the planar segments 136a and 136b of the backup ring 106 when the sealing apparatus 100 is energized. Further, the sealing ring 108 includes a substantially arc-shaped convex surface 146 opposing the nose 142. The convex surface 146 faces generally in the axial direction 56. Finally, the sealing ring 108 includes oppositely inclined interior and exterior walls 148 and 150. In several exemplary embodiments, the interior and exterior walls 148 and 150 each have a generally frusto-conical shape. The interior wall 148 defines opposing edges 148a and 148b. Similarly, the exterior wall 150 defines opposing edges 150a and 150b. The nose 142 adjoins the interior and exterior walls 148 and 150, so that the surface 144a of the nose 142 adjoins the interior wall 148 and the surface 144b of the nose 142 adjoins the exterior wall 150. In contrast, the convex surface 146 adjoins the interior and exterior walls 148 and 150 at the respective edges 148b and 150b thereof.

In several exemplary embodiments, the sealing ring 108 is formed of an elastomeric material such as Viton®, Aflas®, Kalraz®, or the like. Additionally, the sealing ring 108 may be formed of another elastomer, such as, for example, synthetic rubber, butadiene rubber, nitrile rubber, fluoroelastomer, perfluoroelastomer, or the like. Moreover, the sealing ring 108 may be formed of another thermoplastic or thermoset material, such as, for example, polyetheretherketone (PEEK) or polytetrafluoroethylene (PTFE), a.k.a. Teflon®, among others. Other materials could also be used to form the sealing ring 108 based on factors such as chemical compatibility, application temperature, sealing pressure, and the like. In any event, the sealing ring 108 is adapted to expand outwardly to provide contact stress against the axially-extending surface 50 of the seal mandrel 44 and the interior bore 60 of the receptacle 46 when the sealing apparatus 100 is energized. The structure of the sealing ring 108 will be discussed in further detail below with reference to FIG. 4.

The compression ring 110 extends about the seal mandrel 44 and is disposed within the annular groove 48, adjacent and between the sealing ring 108 and the energizing element 112. The compression ring 110 includes a generally planar surface 152 facing in the axial direction 58. The planar surface 152 is adapted to engage the convex surface 146 of the sealing ring 108 when the sealing apparatus 100 is energized. The compression ring 110 also includes a substantially V-shaped concave surface 154 opposing the planar surface 152 and facing generally in the axial direction 56. Moreover, an interior wall 156 of the compression ring 110 adjoins and extends axially between the planar surface 152 and the concave surface 154. Similarly, an exterior wall 158 of the compression ring 110 adjoins and extends axially between the planar surface 152 and the concave surface 154, opposite the interior wall 156. In several exemplary embodiments, the interior and exterior walls 156 and 158 are spaced in a substantially parallel relation.

In several exemplary embodiments, the compression ring 110 is formed of a rigid material, such as, for example, plastic, composite, metal, another rigid material, or any combination thereof. However, other materials could be used to form the compression ring 110 based on factors such as chemical compatibility, application temperature, sealing pressure, and the like. Additionally, even though the compression ring 110 has been depicted as having the planar surface 152, the concave surface 154, and the interior and exterior walls 156 and 158, the compression ring 110 could have alternate shapes or configurations. In any event, the compression ring 110 is adapted to depress the convex surface 146 of the sealing ring 108 when the sealing apparatus 100 is energized.

The energizing element 112 extends about the seal mandrel 44 and is disposed within the annular groove 48, adjacent and between the compression ring 110 and the annular shoulder 54. The energizing element 112 includes a substantially V-shaped nose 160 facing generally in the axial direction 58. The nose 160 is adapted to engage the concave surface 154 of the compression ring 110 when the sealing apparatus 100 is energized. The energizing element 112 also includes a generally planar surface 162 opposing the nose 160 and facing in the axial direction 56. Moreover, an interior wall 164 of the energizing element 112 adjoins and extends axially between the nose 160 and the planar surface 162. Similarly, an exterior wall 166 of the energizing element 112 adjoins and extends axially between the nose 160 and the planar surface 162, opposite the interior wall 164. In several exemplary embodiments, the interior and exterior walls 164 and 166 are spaced in a substantially parallel relation. In several exemplary embodiments, the energizing element 112 is formed of an elastomer, such as, for example, synthetic rubber, butadiene rubber, nitrile rubber, fluoroelastomer, perfluoroelastomer, a thermoplastic or thermoset material, or the like. In several exemplary embodiments, the energizing element 112 is formed of rigid material, such as, for example, plastic, composite, metal, another rigid material, or any combination thereof. However, other materials could be used to form the energizing element 112 based on factors such as chemical compatibility, application temperature, sealing pressure, and the like. Additionally, even though the energizing element 112 has been depicted as having the nose 160, the planar surface 162, and the interior and exterior walls 164 and 166, the energizing element 112 could have alternate shapes or configurations, such as, for example, quad rings, square block seals, beta seals, and the like. In any event, the energizing element 112 is adapted to energize the sealing apparatus 100 when sufficient fluid pressure is applied thereto. Additionally, the energizing element 112 provides support to the sealing apparatus 100 when the sealing apparatus 100 is not energized.

Figure 4:
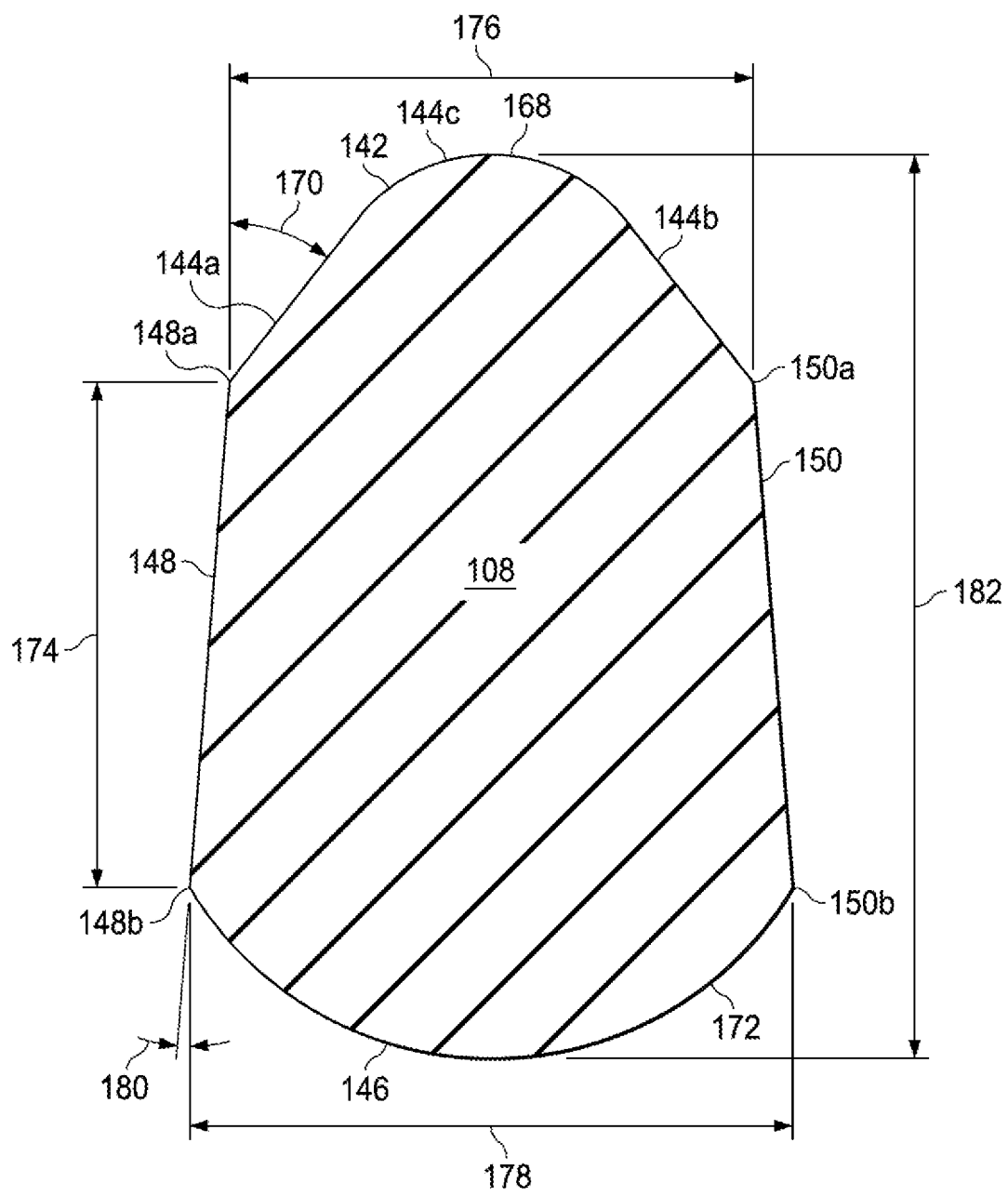
FIG. 4 is radial cross-section of the sealing ring of FIG. 3, according to an exemplary embodiment.

Referring now to FIG. 4, an exemplary embodiment of the sealing ring 108 is illustrated, including the nose 142, the convex surface 146, and the interior and exterior walls 148 and 150. More particularly, FIG. 4 depicts a radial cross-section of the sealing ring 108, taken along a radius that intersects the longitudinal center axis of the sealing ring 108.

The surfaces 144a and 144b of the nose 142 adjoin the convex surface 144c of the nose 142. In an exemplary embodiment, the convex surface 144c defines a radius 168 of 0.07 inches. The surfaces 144a and 144b also adjoin the edges 148a and 150a of the interior and exterior walls 148 and 150, respectively. In an exemplary embodiment, the surfaces 144a and 144b each define an inclination angle 170 of 37.5 degrees measured from the longitudinal center axis of the sealing ring 108. Moreover, the edges 148b and 150b of the interior and exterior surfaces 148 and 150, respectively, adjoin the convex surface 144c. In an exemplary embodiment, the convex surface 144c defines a radius 172 of 0.120 inches. Moreover, the interior and exterior walls 148 and 150 each define a wall height 174 of 0.180 inches. In an exemplary embodiment, the sealing ring 108 defines a width 176 of 0.185 inches measured between the edges 148a and 150a of the interior and exterior walls 148 and 150, respectively. Similarly, the sealing ring 108 defines a width 178 of 0.212 inches measured between the edges 148b and 150b of the interior and exterior walls 148 and 150, respectively. As a result, the interior and exterior walls 148 and 150 each define an inclination angle 180 of 4.3 degrees measured from the longitudinal center axis of the sealing ring 108. Finally, in an exemplary embodiment, the sealing ring 108 defines an overall height 182 of 0.319 inches between the center point of the convex surface 146 and the center point of the convex surface 144c.

Although an exemplary embodiment of the sealing ring 108 is described above, including the dimensions of the radii 168 and 172, the angles 170 and 180, the heights 174 and 182, and the widths 176 and 178, it should be understood that the dimensions of the sealing ring 108 may be changed to suit a variety of different applications. In several exemplary embodiments, the ratio of the radius 168 to the radius 172 is between 0.5 and 0.7. In some embodiments, the ratio of the radius 168 to the radius 172 is between 0.55 and 0.65. In still other embodiments, the ratio of the radius 168 to the radius 172 is about 0.58. Further, in several exemplary embodiments, the ratio of the angle 170 to the angle 180 is between 8 and 10. In some embodiments, the ratio of the angle 170 to the angle 180 is between 8.5 and 9.5. In still other embodiments, the ratio of the angle 170 to the angle 180 is about 8.74. Further still, in several exemplary embodiments, the ratio of the height 174 to the height 182 is between 0.45 and 0.65. In some embodiments, the ratio of the height 174 to the height 182 is between 0.5 and 0.6. In still other embodiments, the ratio of the height 174 to the height 182 is about 0.56. Finally, in several exemplary embodiments, the ratio of the width 176 to the width 178 is between 0.75 and 0.95. In some embodiments, the ratio of the width 176 to the width 178 is between 0.8 and 0.9. In still other embodiments, the ratio of the width 176 to the width 178 is about 0.87. Moreover, in several exemplary embodiments, the ratio of the width 178 to the overall height 182 is between 0.55 and 0.75. In some embodiments, the ratio of the width 178 to the overall height 182 is between 0.6 and 0.7. In still other embodiments, the ratio of the width 178 to the overall height 182 is about 0.66.

Figure 5A:
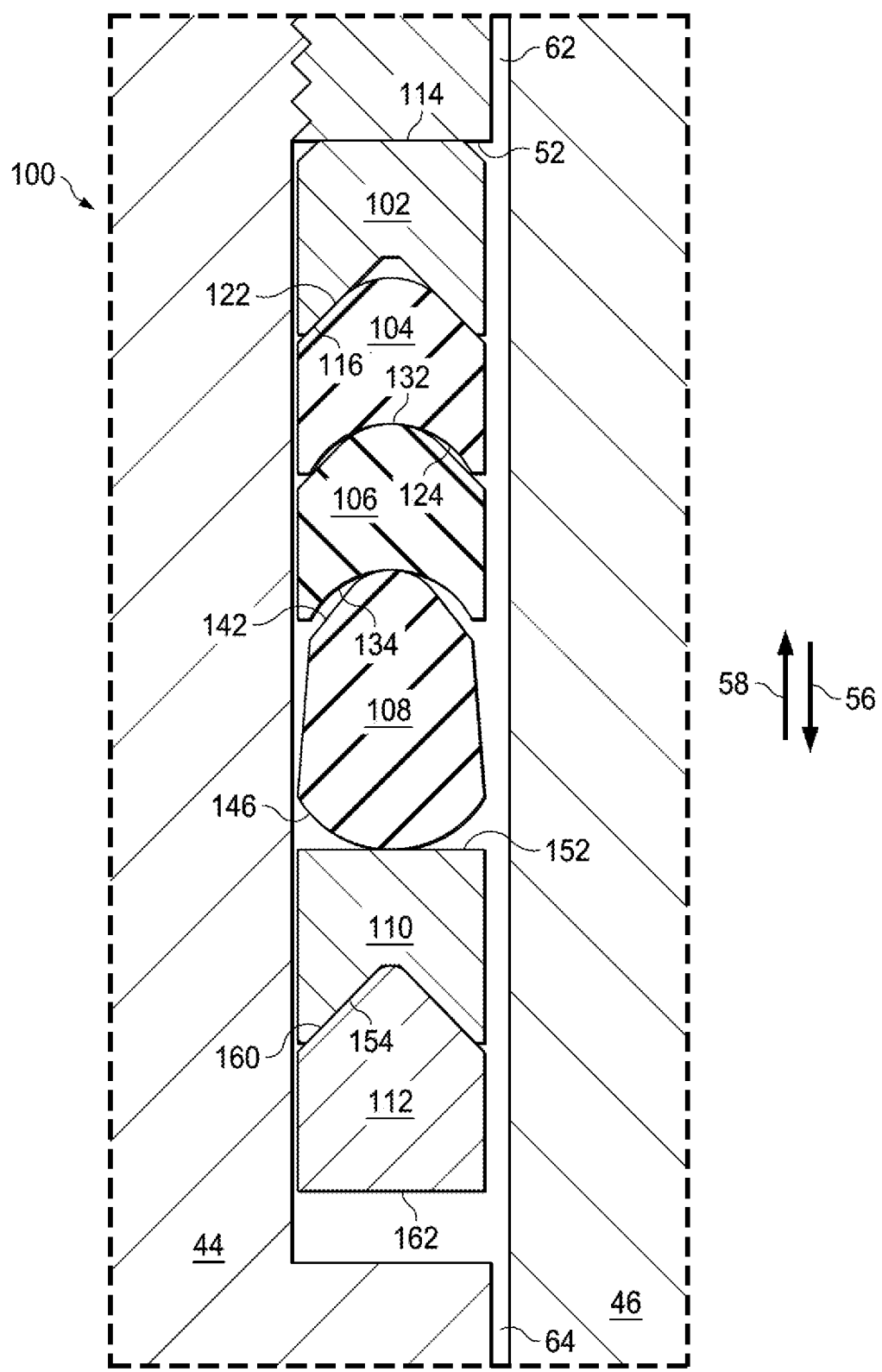
FIG. 5A is a radial cross-section of the sealing apparatus of FIGS. 2-4 in an un-energized configuration, according to an exemplary embodiment.
Figure 5B:
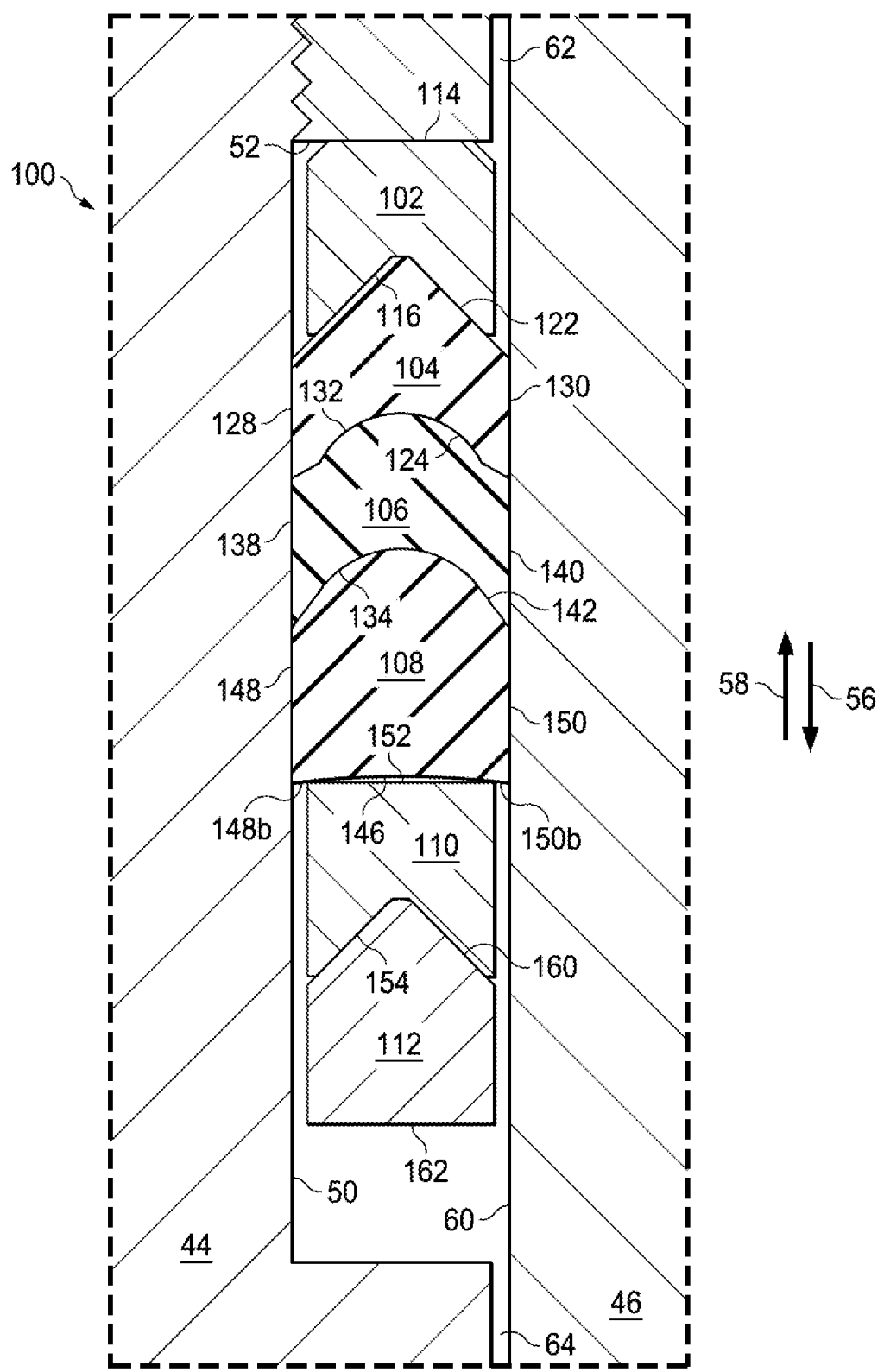
FIG. 5B is a radial cross-section of the sealing apparatus of FIGS. 2-4 and 5A in an energized configuration, according to an exemplary embodiment.

In operation, an exemplary embodiment of which is illustrated in FIGS. 5A and 5B, the sealing apparatus 100 forms a seal against a fluid pressure in the annular space defined by the clearance gaps 62, 64, and 66. Specifically, the sealing apparatus 100 acts as a unidirectional seal that prevents, or at least obstructs, the migration of a pressurized fluid from the clearance gap 64 to the clearance gap 62, in the axial direction 58. Specifically, when the pressure in the clearance gap 64 is higher than the pressure in the clearance gap 62, the force of the pressurized fluid acts on the planar surface 162 of the energizing element 112 to urge the energizing element 112 in the axial direction 58. As a result, the sealing apparatus 100 is compressed against the annular shoulder 52 of the seal mandrel 44 so that the various components of the sealing apparatus 100 engage one another, as shown in FIG. 5A. Specifically, the nose 160 of the energizing element 112 engages the concave surface 154 of the compression ring 110; the planar surface 152 of the compression ring 110 engages the convex surface 146 of the sealing ring 108; the nose 142 of the sealing ring 108 engages the concave surface 134 of the back-up ring 106; the nose 132 of the back-up ring 106 engages the concave surface 124 of the back-up ring 104; the nose 122 of the back-up ring 104 engages the concave surface 116 of the adapter 102; and the planar surface 114 of the adapter 102 engages the annular shoulder 52 of the seal mandrel 44. The sealing ring 108 is pliable so that the pressurized fluid energizes the sealing ring 108, as shown in FIG. 5B. The pressure at which the sealing ring 108 becomes energized depends upon factors such as the material composition of the sealing ring 108, the chemical compatibility between the sealing ring 108 and the application fluid, the temperature of the application fluid, and the like. The sealing ring 108 is energized by the interaction of the planar surface 152 of the compression ring 110 with the convex surface 146 of the sealing ring 108 and, additionally, the interaction of the nose 142 of the sealing ring 108 with the concave surface 134 of the back-up ring 106. In several exemplary embodiments, the sealing ring 108 is energized by direct contact with the pressurized fluid.

Energizing the sealing ring 108 causes both axial compression and radial expansion of the sealing ring 108. The axial compression of the sealing ring 108 causes the nose 142 of the sealing ring 108 to conform with the concave surface 134 of the back-up ring 106. Moreover, the convex surface 146 of the sealing ring 108 is depressed by the planar surface 152 of the compression ring 110, causing the interior and exterior walls 148 and 150 of the sealing ring 108 to expand outwardly and engage both the seal mandrel 44 and the receptacle 46. The resulting contact stress exerted on the seal mandrel 44 and the receptacle 46 by the sealing ring 108 exceeds the pressure exerted on the sealing ring 108 by the pressurized fluid. The cross-sectional shape of the sealing ring 108 causes the contact stress exerted on the seal mandrel 44 and the receptacle 46 to be concentrated and maximized near the edges 148b and 150b of the interior and exterior walls 148 and 150, respectively. The concentration of the contact stress near the edges 148b and 150b causes the sealing ring 108 to sealingly engage both the axially-extending surface 50 of the seal mandrel 44 and the interior bore 60 of the receptacle 46. Moreover, when the contact stress is concentrated near the edges 148b and 150b of the sealing ring 108, the back-up rings 104 and 106 better equipped to prevent, or at least obstruct, extrusion of the sealing ring 108, as will be discussed in further detail below.

When the back-up ring 106 reaches a threshold temperature range, the back-up ring 106 becomes pliable so that the pressurized fluid energizes the back-up ring 106, as shown in FIG. 5B. The pressure at which the back-up ring 106 becomes energized depends upon factors such as the material composition of the back-up ring 106, the chemical compatibility between the back-up ring 106 and the application fluid, the temperature of the application fluid, and the like. The back-up ring 106 is energized by the interaction of the nose 142 of the sealing ring 108 with the concave surface 134 of the back-up ring 106 and, additionally, the interaction of the nose 132 of the back-up ring 106 with the concave surface 124 of the back-up ring 104.

Energizing the back-up ring 106 causes both axial compression and radial expansion of the back-up ring 106. The axial compression of the back-up ring 106 causes the nose 132 of the back-up ring 106 to conform with the concave surface 124 of the back-up ring 104. Moreover, the interior and exterior walls 138 and 140 of the back-up ring 106 flare outwardly to engage both the axially-extending surface 50 of the seal mandrel 44 and the interior bore 60 of the receptacle 46. In several exemplary embodiments, the outward flaring of the back-up ring 106 prevents, or at least obstructs, extrusion of the sealing ring 108.

When the back-up ring 104 reaches a threshold temperature range, the back-up ring 104 becomes pliable so that the pressurized fluid energized the back-up ring 104, as shown in FIG. 5B. The pressure at which the back-up ring 104 becomes energized depends upon factors such as the material composition of the back-up ring 104, the chemical compatibility between the application fluid and the back-up ring 104, the temperature of the application fluid, and the like. The back-up ring 104 is energized by the interaction of the nose 132 of the back-up ring 106 with the concave surface 124 of the back-up ring 104 and, additionally, the interaction of the nose 122 of the back-up ring 104 with the concave surface 116 of the adapter 102.

Energizing the back-up ring 104 causes both axial compression and radial expansion of the back-up ring 104. The axial compression of the back-up ring 104 causes the nose 122 of the back-up ring 104 to conform with the concave surface 116 of the adapter 102. Moreover, the interior and exterior walls 128 and 130 of the back-up ring 104 flare outwardly to engage both the axially-extending surface 50 of the seal mandrel 44 and the interior bore 60 of the receptacle 46. In several exemplary embodiments, the outward flaring of the back-up ring 104 prevents, or at least obstructs, extrusion of the back-up ring 106 and, consequently, the sealing ring 108.

In several exemplary embodiments, the sealing ring 108 and the back-up rings 104 and 106 become energized at different pressures and/or temperatures of the application fluid. Specifically, the back-up ring 106 could be made of a material that prevents extrusion of the sealing ring 108 within a first temperature and/or pressure range. Moreover, the back-up ring 104 could be made of a material that prevents extrusion of the back-up ring 106 and, consequently, the sealing ring 108, within a second temperature and/or pressure range that is generally higher than the first temperature and/or pressure range. For example, in one or more embodiments, the sealing ring 108 is made of 90 durometer Viton®, the back-up ring 106 is made of 25% glass-filled polytetrafluoroethylene (PTFE), a.k.a. Teflon®, and the back-up ring 104 is made of polyetheretherketone (PEEK). The 25% glass-filled polytetrafluoroethylene (PTFE) of the back-up ring 106 is capable of controlling extrusion of the sealing ring 108 at temperatures below 300° F. However, as the temperature of the application fluid approaches 300° F., the back-up ring 106 is prone to extrusion. Accordingly, the polyetheretherketone (PEEK) of the back-up ring 104 controls extrusion of the back-up ring 106 and the sealing ring 108 at temperatures near or above 300° F.

In several exemplary embodiments, the back-up ring 104 is omitted so that the sealing apparatus 100 includes the adapter 102, the back-up ring 106, the sealing ring 108, the compression ring 110, and the energizing element 112. In several exemplary embodiments, the back-up ring 106 is omitted so that the sealing apparatus 100 includes the adapter 102, the back-up ring 104, the sealing ring 108, the compression ring 110, and the energizing element 112. In several exemplary embodiments, one or both of the compression ring 110 and the energizing element 112 are omitted so that the sealing apparatus 100 includes the adapter 102, one or both of the back-up rings 104 and 106, and the sealing ring 108. Additionally, although the sealing ring 108 has been described as part of the sealing apparatus 100, in several exemplary embodiments, the sealing ring 108 is, includes, or is part of another sealing apparatus. In several exemplary embodiments, the sealing apparatus 100 is reversed so that, instead of preventing, or at least obstructing, migration of the pressurized fluid from the clearance gap 64 to the clearance gap 62, in the axial direction 58, the sealing apparatus 100 prevents, or at least obstructs, migration of the pressurized fluid from the clearance gap 62 to the clearance gap 64, in the axial direction 56. In several exemplary embodiments, one or more additional sealing apparatus 100 may be provided within the annular groove 48 to provide one or more redundant seals adapted to prevent, or at least obstruct, migration of pressurized fluid from the clearance gap 64 to the clearance gap 62, in the axial direction 58. In several exemplary embodiments, one or more additional sealing apparatus 100 may be provided within the annular groove 48 to provide one or more redundant seals adapted to prevent, or at least obstruct, migration of the pressurized fluid from the clearance gap 62 to the clearance gap 64, in the axial direction 56.

In several exemplary embodiments, a pair of the sealing apparatus 100 is provided opposite one another within the annular groove 48 so that one of the sealing apparatus 100 prevents, or at least obstructs, migration of the pressurized fluid from the clearance gap 64 to the clearance gap 62, in the axial direction 58, and the other of the sealing apparatus 100 prevents, or at least obstructs, migration of the pressurized fluid from the clearance gap 62 to the clearance gap 64, in the axial direction 56. Similarly, in several exemplary embodiments, two or more of the sealing apparatus 100 are provided within the annular groove 48 so that at least one of the sealing apparatus 100 prevents, or at least obstructs, migration of the pressurized fluid from the clearance gap 64 to the clearance gap 62, in the axial direction 58, and at least one other of the sealing apparatus 100 prevents, or at least obstructs, migration of the pressurized fluid from the clearance gap 62 to the clearance gap 64, in the axial direction 56, with any additional sealing apparatus 100 providing one or more redundant seals, as described above.

In several exemplary embodiments, the convex surface 146 of the sealing ring 108 is not limited to a simple arc-shape but may also define a more complex shape based on mathematical equations used to tune the contact stress exerted on the seal mandrel 44 and the receptacle 46 by the sealing ring 108. Moreover, the shape of the convex surface 146 may be determined using a tabulation of empirical results to optimize the contact stress exerted on the seal mandrel 44 and the receptacle 46 by the sealing ring 108. In several exemplary embodiments, although the sealing ring 108 is not immune to the effects of temperature dependent decaying bulk modulus values, the sealing ring 108 is better able to retain its shape under elevated temperature and pressure conditions than a chevron seal. In several exemplary embodiments, under elevated pressure and temperature conditions, the contact stress exerted on the seal mandrel 44 and the receptacle 46 by the sealing ring 108 is greater than the contact stress that would be exerted on these components by a chevron seal.

The present disclosure introduces a sealing apparatus adapted to be positioned in an annular space between concentrically disposed members, the sealing apparatus including a sealing ring defining oppositely inclined interior and exterior surfaces each having a generally frusto-conical shape and defining opposing first and second edges, a nose adjoining the respective first edges of the interior and exterior surfaces, and a first convex surface adjoining the respective second edges of the interior and exterior surfaces opposite the nose; wherein, when the sealing apparatus is positioned in the annular space and in an energized configuration, the first convex surface of the sealing ring is adapted to be depressed so that the interior and exterior surfaces thereof expand radially to exert contact stress on each of the concentrically disposed members. In an exemplary embodiment, when the first convex surface of the sealing ring is depressed, the contact stress exerted on each of the concentrically disposed members by the sealing ring exceeds a fluid pressure within the annular space, causing the sealing ring to form a seal against the fluid pressure in the annular space. In an exemplary embodiment, the sealing apparatus further includes a compression ring adapted to be disposed adjacent the sealing ring within the annular space, the compression ring defining a planar surface adapted to engage the first convex surface of the sealing ring, wherein, when the sealing apparatus is positioned in the annular space and in the energized configuration, the fluid pressure within the annular space urges the planar surface of the compression ring to depress the first convex surface of the sealing ring. In an exemplary embodiment, the sealing apparatus further includes a first back-up ring adapted to be disposed adjacent the sealing ring within the annular space, the first back-up ring defining a first concave surface that is adapted to be engaged by the nose of the sealing ring, wherein, when the sealing apparatus is positioned in the annular space and in the energized configuration, the fluid pressure within the annular space urges the nose of the sealing ring to conform with the first concave surface of the first back-up ring, causing the first back-up ring to flare outwardly and engage the concentrically disposed members. In an exemplary embodiment, the sealing apparatus further includes a second back-up ring adapted to be disposed adjacent the first back-up ring within the annular space, the second back-up ring defining a second concave surface that is adapted to be engaged by the first back-up ring, wherein, when the sealing apparatus is positioned in the annular space an in the energized configuration, the fluid pressure within the annular space urges the first back-up ring to conform with the second concave surface of the second back-up ring, causing the second back-up ring to flare outwardly and engage the concentrically disposed members. In an exemplary embodiment, when the first back-up ring flares outwardly to engage the concentrically disposed members, extrusion of the sealing ring is restricted within a first temperature range; and, when the second back-up ring flares outwardly to engage the concentrically disposed members, extrusion of the first back-up ring and, consequently, the sealing ring is restricted within a second temperature range, the second temperature range being generally higher than the first temperature range. In an exemplary embodiment, the sealing ring has a first width measured between the respective first edges of the interior and exterior surfaces and a second width measured between the respective second edges of the interior and exterior surfaces, the first width being smaller than the second width. In an exemplary embodiment, the interior and exterior surfaces of the sealing ring define first and second inclination angles, respectively, measured from a longitudinal center axis of the sealing ring, the first and second inclination angles being substantially equal to one another. In an exemplary embodiment, the nose of the sealing ring defines oppositely inclined first and second surfaces each having a generally frusto-conical shape and defining opposing third and fourth edges, and a second convex surface adjoining the respective third edges of the first and second surfaces; and the sealing ring has a third width measured between the respective third edges of the first and second surfaces, the third width being smaller than the first and second widths. In an exemplary embodiment, the first and second surfaces of the sealing ring define third and fourth inclination angles, respectively, measured from the longitudinal center axis of the sealing ring, the third and fourth inclination angles being substantially equal to one another and greater than the first and second inclination angles.

The present disclosure also introduces a method of sealing an annular space between concentrically disposed members, the method including providing a sealing ring within the annular space, the sealing ring defining oppositely inclined interior and exterior surfaces each having a generally frusto-conical shape and defining opposing first and second edges, a nose adjoining the respective first edges of the interior and exterior surfaces, and a first convex surface adjoining the respective second edges of the interior and exterior surfaces opposite the nose; and forming a seal against a fluid pressure in the annular space, including depressing the first convex surface of the sealing ring so that the interior and exterior surfaces thereof expand radially to exert contact stress on each of the concentrically disposed members. In an exemplary embodiment, when the first convex surface of the sealing ring is depressed, the contact stress exerted on each of the concentrically disposed members by the sealing ring exceeds the fluid pressure within the annular space, causing the sealing ring to form the seal against the fluid pressure in the annular space. In an exemplary embodiment, the method further includes providing a compression ring adjacent the sealing ring within the annular space, the compression ring defining a planar surface that engages the first convex surface of the sealing ring; and depressing the first convex surface of the sealing ring includes urging the planar surface of the compression ring against the first convex surface of the sealing ring. In an exemplary embodiment, the method further includes providing a first back-up ring adjacent the sealing ring within the annular space, the first back-up ring defining a first concave surface that is engaged by the nose of the sealing ring; and depressing the first convex surface of the sealing ring causes the nose of the sealing ring to conform with the first concave surface of the first back-up ring, forcing the first back-up ring to flare outwardly to engage the concentrically disposed members. In an exemplary embodiment, the method further includes providing a second back-up ring adjacent the first back-up ring within the annular space, the second back-up ring defining a second concave surface that is engaged by the first back-up ring; and depressing the first convex surface of the sealing ring causes the first back-up ring to conform with the second concave surface of the second back-up ring, forcing the second back-up ring to flare outwardly to engage the concentrically disposed members. In an exemplary embodiment, when the first back-up ring flares outwardly to engage the concentrically disposed members, extrusion of the sealing ring is restricted within a first temperature range; and, when the second back-up ring flares outwardly to engage the concentrically disposed members, extrusion of the first back-up ring and, consequently, the sealing ring is restricted within a second temperature range, the second temperature range being generally higher than the first temperature range. In an exemplary embodiment, the sealing ring has a first width measured between the respective first edges of the interior and exterior surfaces and a second width measured between the respective second edges of the interior and exterior surfaces, the first width being smaller than the second width. In an exemplary embodiment, the interior and exterior surfaces of the sealing ring define first and second inclination angles, respectively, measured from a longitudinal center axis of the sealing ring, the first and second inclination angles being substantially equal to one another. In an exemplary embodiment, the nose of the sealing ring defines oppositely inclined first and second surfaces each having a generally frusto-conical shape and defining opposing third and fourth edges, and a second convex surface adjoining the respective third edges of the first and second surfaces; and the sealing ring has a third width measured between the respective third edges of the first and second surfaces, the third width being smaller than the first and second widths. In an exemplary embodiment, the first and second surfaces of the sealing ring define third and fourth inclination angles, respectively, measured from the longitudinal center axis of the sealing ring, the third and fourth inclination angles being substantially equal to one another and greater than the first and second inclination angles.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An apparatus, comprising:
first and second concentrically disposed members;
a monolithic sealing ring having a convexly-shaped radial cross section and positioned within an annular space between the first and second concentrically disposed members, the monolithic sealing ring comprising:
oppositely inclined interior and exterior surfaces each having a generally frusto-conical shape and defining opposing first and second edges, the convexly-shaped radial cross section of the monolithic sealing ring having a first width measured between the respective first edges of the interior and exterior surfaces and a second width measured between the respective second edges of the interior and exterior surfaces, the first width being smaller than the second width;
a nose, comprising:
a first portion having a first radius of curvature, which first portion forms a first convex surface; and
opposing second and third portions adjoining the respective first edges of the interior and exterior surfaces;
and
a second convex surface adjoining the respective second edges of the interior and exterior surfaces opposite the nose;
a compression ring positioned within the annular space on one side of, and directly adjacent to, the monolithic sealing ring, the compression ring defining a planar first surface adapted to engage the second convex surface of the monolithic sealing ring;
a back-up ring positioned within the annular space on another side of, and directly adjacent to, the monolithic sealing ring, the back-up ring defining a concave second surface adapted to be engaged by the first portion of the nose, the concave second surface having a second radius of curvature that is greater than the first radius of curvature;
a first configuration, in which:
the planar first surface of the compression ring engages the second convex surface of the monolithic sealing ring;
the first portion of the nose engages the concave second surface of the back-up ring;
the compression ring is spaced apart from the back-up ring by a first distance;
at least respective portions of the interior and exterior surfaces are disengaged from the first and second concentrically disposed members, respectively; and
the opposing second and third portions of the nose are disengaged from the concave second surface of the back-up ring;
and
a second configuration, in which:
the planar first surface of the compression ring engages the second convex surface of the monolithic sealing ring;
the first portion of the nose engages the concave second surface of the back-up ring;
the compression ring is spaced apart from the back-up ring by a second distance that is less than the first distance;
the at least respective portions of the interior and exterior surfaces of the monolithic sealing ring engage the first and second concentrically disposed members, respectively; and
the opposing second and third portions of the nose engage the concave second surface of the back-up ring.

2. The apparatus of claim 1,
wherein the nose of the monolithic sealing ring defines:
said opposing second and third portions, which opposing second and third portions form oppositely inclined first and second surfaces, respectively, each having a generally frusto-conical shape and defining opposing third and fourth edges, the respective fourth edges adjoining the respective first edges of the interior and exterior surfaces, the convexly-shaped radial cross section of the monolithic sealing ring having the second width measured between the respective fourth edges of the first and second surfaces and a third width measured between the respective third edges of the first and second surfaces, the third width being smaller than the second width; and
said first portion forming the first convex surface, which first convex surface adjoins the respective third edges of the first and second surfaces.

3. The apparatus of claim 1, wherein a first ratio of the first width to the second width ranges from 0.75 to 0.95.

4. The apparatus of claim 2, wherein a first ratio of the first width to the second width ranges from 0.75 to 0.95; and
wherein a second ratio of the third or fourth inclination angle to the first or second inclination angle ranges from 8 to 10.

5. The apparatus of claim 4, wherein the first and second convex surfaces have first and second radii, respectively, and a third ratio of the second radius to the first radius ranges from 0.5 to 0.7.

6. The apparatus of claim 5, wherein the monolithic sealing ring defines a third height measured from a crest of the first convex surface to a crest of the second convex surface, and a fourth ratio of the first or second height to the third height ranges from 0.45 to 0.65.

7. The apparatus of claim 6, wherein a fifth ratio of the second width to the third height ranges from 0.55 to 0.75.

8. The apparatus of claim 1, wherein the interior surface has a first height and defines a first inclination angle; and
wherein the exterior surface has a second height and defines a second inclination angle, the second height being equal to the first height, and the second inclination angle being oppositely inclined from, and equal to, the first inclination angle.

9. The apparatus of claim 2, wherein the interior surface has a first height and defines a first inclination angle;
wherein the exterior surface has a second height and defines a second inclination angle, the second height being equal to the first height, and the second inclination angle being oppositely inclined from, and equal to, the first inclination angle; and
wherein the first surface defines a third inclination angle and the second surface defines a fourth inclination angle, the fourth inclination angle being oppositely inclined from, and equal to, the third inclination angle.

10. A method of sealing an annular space between first and second concentrically disposed members, the method comprising:
positioning a monolithic sealing ring having a convexly-shaped radial cross section within the annular space between the first and second concentrically disposed members, the monolithic sealing ring comprising:
oppositely inclined interior and exterior surfaces each having a generally frusto-conical shape and defining opposing first and second edges, the convexly-shaped radial cross section of the monolithic sealing ring having a first width measured between the respective first edges of the interior and exterior surfaces and a second width measured between the respective second edges of the interior and exterior surfaces, the first width being smaller than the second width;
a nose, comprising:
a first portion having a first radius of curvature, which first portion forms a first convex surface; and
opposing second and third portions adjoining the respective first edges of the interior and exterior surfaces;
and
a second convex surface adjoining the respective second edges of the interior and exterior surfaces opposite the nose;
positioning a compression ring within the annular space on one side of, and directly adjacent to, the monolithic sealing ring, the compression ring defining a planar first surface adapted to engage the second convex surface of the monolithic sealing ring;
positioning a back-up ring within the annular space on another side of, and directly adjacent to, the monolithic sealing ring, the back-up ring defining a concave second surface adapted to be engaged by the first portion of the nose, the concave second surface having a second radius of curvature that is greater than the first radius of curvature;
and
actuating the monolithic sealing ring, the compression ring, and the back-up ring from a first configuration to a second configuration to seal the annular space between the first and second concentrically disposed members, wherein, in the first configuration:
the planar first surface of the compression ring engages the second convex surface of the monolithic sealing ring;
the first portion of the nose engages the concave second surface of the back-up ring;
the compression ring is spaced apart from the back-up ring by a first distance;
at least respective portions of the interior and exterior surfaces are disengaged from the first and second concentrically disposed members, respectively; and
the opposing second and third portions of the nose are disengaged from the concave second surface of the back-up ring;
wherein, in the second configuration:
the planar first surface of the compression ring engages the second convex surface of the monolithic sealing ring;
the first portion of the nose engages the concave second surface of the back-up ring;
the compression ring is spaced apart from the back-up ring by a second distance that is less than the first distance;
the at least respective portions of the interior and exterior surfaces of the monolithic sealing ring engage the first and second concentrically disposed members, respectively; and
the opposing second and third portions of the nose engage the concave second surface of the back-up ring;
and
wherein actuating the monolithic sealing ring, the compression ring, and the back-up ring from the first configuration to the second configuration comprises communicating a fluid pressure to the annular space on the one side of the monolithic sealing ring.

11. The method of claim 10,
wherein the nose of the monolithic sealing ring defines:
said opposing second and third portions, which opposing second and third portions form oppositely inclined first and second surfaces, respectively, each having a generally frusto-conical shape and defining opposing third and fourth edges, the respective fourth edges adjoining the respective first edges of the interior and exterior surfaces, the convexly-shaped radial cross section of the monolithic sealing ring having the second width measured between the respective fourth edges of the first and second surfaces and a third width measured between the respective third edges of the first and second surfaces, the third width being smaller than the second width; and
said first portion forming the first convex surface, which first convex surface adjoins the respective third edges of the first and second surfaces.

12. The method of claim 10, wherein a first ratio of the first width to the second width ranges from 0.75 to 0.95.

13. The method of claim 11, wherein a first ratio of the first width to the second width ranges from 0.75 to 0.95; and
wherein a second ratio of the third or fourth inclination angle to the first or second inclination angle ranges from 8 to 10.

14. The method of claim 13, wherein the first and second convex surfaces have first and second radii, respectively, and a third ratio of the second radius to the first radius ranges from 0.5 to 0.7.

15. The method of claim 14, wherein the monolithic sealing ring defines a third height measured from a crest of the first convex surface to a crest of the second convex surface, and a fourth ratio of the first or second height to the third height ranges from 0.45 to 0.65.

16. The method of claim 15, wherein a fifth ratio of the second width to the third height ranges from 0.55 to 0.75.

17. The method of claim 10, wherein the interior surface has a first height and defines a first inclination angle; and
wherein the exterior surface has a second height and defines a second inclination angle, the second height being equal to the first height, and the second inclination angle being oppositely inclined from, and equal to, the first inclination angle.

18. The method of claim 11, wherein the interior surface has a first height and defines a first inclination angle; and
wherein the exterior surface has a second height and defines a second inclination angle, the second height being equal to the first height, and the second inclination angle being oppositely inclined from, and equal to, the first inclination angle; and
wherein the first surface defines a third inclination angle and the second surface defines a fourth inclination angle, the fourth inclination angle being oppositely inclined from, and equal to, the third inclination angle.

* * * * *